(12) United States Patent
Isles et al.

(10) Patent No.: US 12,457,105 B2
(45) Date of Patent: Oct. 28, 2025

(54) USING CO-LOCATED SECONDARY DEVICES TO PROTECT AGAINST COOKIE THEFT

(71) Applicant: Google LLC, Mountain View, CA (US)

(72) Inventors: Adrian Isles, Oakland, CA (US); Philipp Pfeiffenberger, San Francisco, CA (US); David Turner, Newark, CA (US)

(73) Assignee: Google LLC, Mountain View, CA (US)

( * ) Notice: Subject to any disclaimer, the term of this patent is extended or adjusted under 35 U.S.C. 154(b) by 223 days.

(21) Appl. No.: 17/513,564

(22) Filed: Oct. 28, 2021

(65) Prior Publication Data

US 2023/0137767 A1    May 4, 2023

(51) Int. Cl.
*H04L 9/32* (2006.01)

(52) U.S. Cl.
CPC .................. *H04L 9/3213* (2013.01)

(58) Field of Classification Search
CPC ..... H04L 9/3213; H04L 9/3247; H04L 63/08; H04L 63/168; H04L 63/18; H04L 63/0853
See application file for complete search history.

(56) References Cited

U.S. PATENT DOCUMENTS

| | | | | |
|---|---|---|---|---|
| 7,929,535 B2* | 4/2011 | Chen | ...................... | H04W 4/029 709/217 |
| 8,752,156 B1* | 6/2014 | van Dijk | ............. | H04W 12/122 726/9 |
| 8,875,236 B2* | 10/2014 | Holtmanns | ............. | H04L 63/12 713/168 |
| 8,984,288 B1* | 3/2015 | Saylor | ................... | H04L 9/3247 713/176 |
| 9,300,646 B1* | 3/2016 | Saylor | ................... | H04W 4/029 |
| 9,836,727 B1* | 12/2017 | Brennan | ................ | G06Q 20/20 |
| 2007/0016943 A1* | 1/2007 | M'Raihi | ................ | G06F 21/33 726/9 |
| 2011/0202424 A1* | 8/2011 | Chun | ................... | G06Q 30/016 705/26.8 |

(Continued)

FOREIGN PATENT DOCUMENTS

WO    2017031504 A1    2/2017

OTHER PUBLICATIONS

PCT Notification of Transmittal of the International Search Report and the Written Opinion of the International Searching Authority for PCT Application No. PCT/US2022/048082, mailed Feb. 27, 2023, 15 pages.

(Continued)

*Primary Examiner* — Abu S Sholeman
(74) *Attorney, Agent, or Firm* — Lowenstein Sandler LLP

(57) ABSTRACT

A method includes receiving, by a service provider platform, a service request from a first client device, and a first instance of an authentication token associated with the service request and generated by the first client device. The service provider platform may further receive, from a second client device, a second instance of the authentication token associated with the service request and generated by the first client device. Responsive to determining that the first instance of the authentication token matches the second instance of the authentication token, the service request is processed by the service provider platform.

21 Claims, 6 Drawing Sheets

(56) References Cited

U.S. PATENT DOCUMENTS

| | | | |
|---|---|---|---|
| 2012/0148043 A1* | 6/2012 | Tofighbakhsh | H04W 12/082 |
| | | | 380/247 |
| 2013/0332358 A1* | 12/2013 | Zhao | G06Q 20/425 |
| | | | 705/44 |
| 2014/0025770 A1* | 1/2014 | Warfield | H04L 45/74 |
| | | | 709/213 |
| 2014/0149177 A1 | 5/2014 | Frank et al. | |
| 2014/0173695 A1* | 6/2014 | Valdivia | G06F 21/33 |
| | | | 726/4 |
| 2014/0230038 A1 | 8/2014 | Leong | |
| 2014/0279945 A1* | 9/2014 | Agarwal | G06F 16/214 |
| | | | 707/690 |
| 2014/0282923 A1* | 9/2014 | Narayan | H04W 12/50 |
| | | | 726/5 |
| 2015/0280994 A1* | 10/2015 | Kim | H04L 63/062 |
| | | | 709/223 |
| 2016/0057139 A1* | 2/2016 | McDonough | H04L 63/168 |
| | | | 726/6 |
| 2016/0286396 A1 | 9/2016 | Tuukkanen | |
| 2018/0046981 A1* | 2/2018 | Honig | G06Q 10/0637 |

OTHER PUBLICATIONS

Office Action for Taiwan Application No. TW111141073, mailed Apr. 11, 2024, 18 Pages.

\* cited by examiner

USING CO-LOCATED SECONDARY DEVICES TO PROTECT AGAINST COOKIE THEFT

TECHNICAL FIELD

The present disclosure generally relates to a technique for protecting a user device against cookie theft. More particularly, the present disclosure relates to using co-located secondary devices to protect against cookie theft.

BACKGROUND

A Hypertext Transfer Protocol (HTTP) cookie (hereafter "cookie") may refer to a file that is stored at a client device and holds some amount of data specific to the particular client device or an application (e.g., browser). Existing service provider platforms (e.g., content sharing platforms, financial platforms, e-commerce platforms, etc.) can use a cookie(s), during a session, to authorize a user account or the application of the client device. For example, a user may log into the service provider platform using user account information (e.g., a username and password). The service provider platform may authorize the user account and may send, to the client device, a cookie. Any subsequent requests to the service provider platform during the session may include the cookie in the requests, where the cookie may be used to authorize services requested by the user account.

Cookie theft occurs when a third party copies the cookie and uses the cookie to impersonate the user of the client device. For example, cookie theft may occur when a user accesses the service provider platform over an unprotected or public Wi-Fi network. Using the cookie, the third party may perform malicious actions, such as making false posts in the user's name or transferring money out of the user account.

SUMMARY

The following presents a simplified summary of various aspects of this disclosure in order to provide a basic understanding of such aspects. This summary is not an extensive overview of all contemplated aspects, and is intended to neither identify key or critical elements nor delineate the scope of such aspects. Its purpose is to present some concepts of this disclosure in a simplified form as a prelude to the more detailed description that is presented later.

In an aspect of the present disclosure, a method comprises a server receiving a service request from a first client device, and receiving a first instance of an authentication token associated with the service request and generated by the first client device. The server may further receive, from a second client device, a second instance of the authentication token associated with the service request and generated by the first client device. Responsive to determining that the first instance of the authentication token matches the second instance of the authentication token, the server may process the service request.

A further aspect of the disclosure provides a system comprising: a memory; and a processing device, coupled to the memory, the processing device to perform a method according to any aspect or embodiment described herein.

A further aspect of the disclosure provides a method comprising generating, by a first client device, a first instance of an authentication token and a second instance of the authentication token. The first client device may send a service request and the first instance of the authentication token to the server. The first client device may further send the second instance of the authentication token to a second client device. The first client device may further receive, from the content sharing platform, a response representing acceptance of the service request by the server, the response indicating that the first instance of the authentication token sent to the server by the first client device matches the second instance of the authentication token sent to the service provider platform by the second client device.

Optional features of one aspect may be combined with other aspects where appropriate.

BRIEF DESCRIPTION OF THE DRAWINGS

Aspects and implementations of the present disclosure will be understood more fully from the detailed description given below and from the accompanying drawings of various aspects and implementations of the disclosure, which, however, should not be taken to limit the disclosure to the specific aspects or implementations, but are for explanation and understanding only.

DETAILED DESCRIPTION

Figure 1:
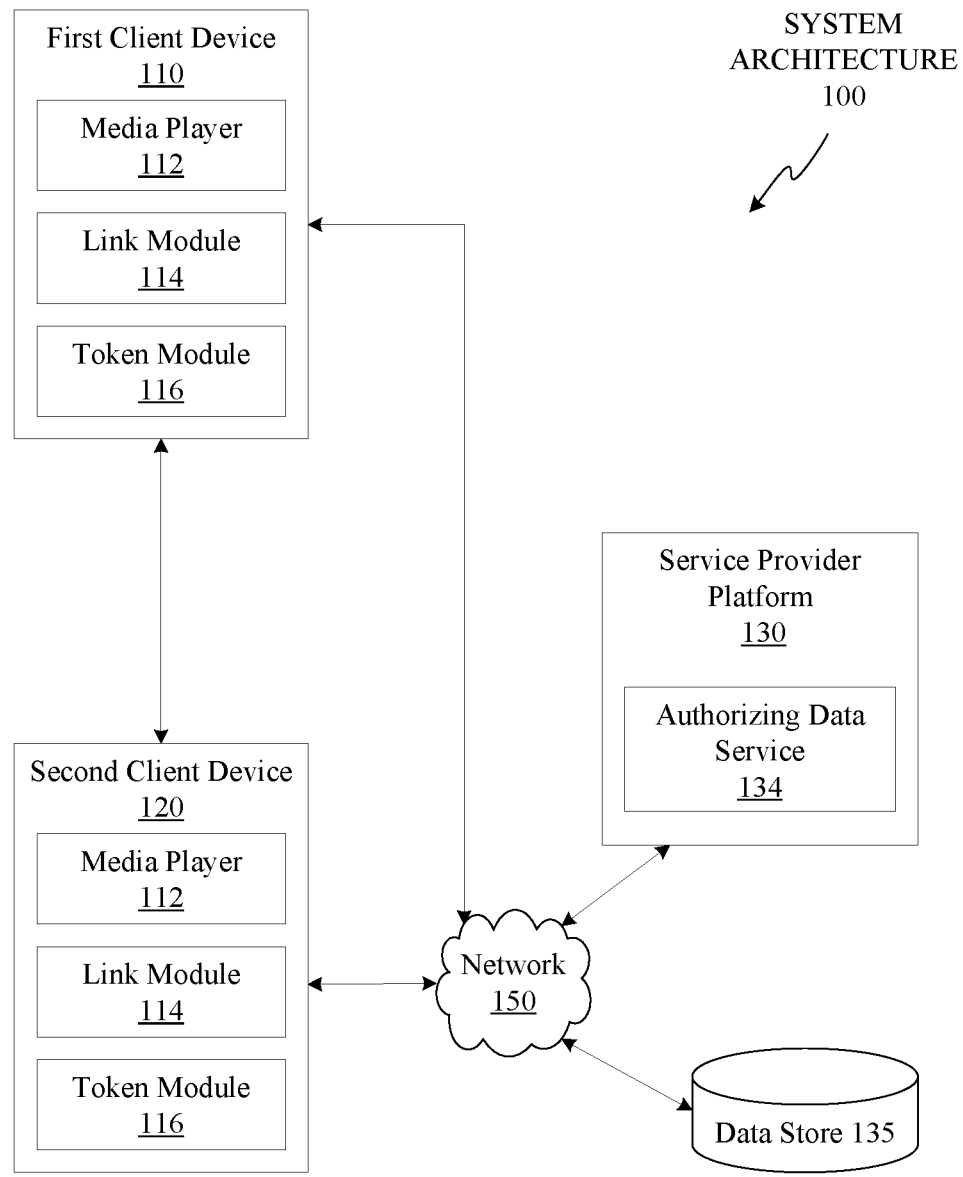
FIG. 1 illustrates an example of system architecture for enabling media features provided on a first client device to be presented on a second client device, in accordance with one implementation of the disclosure.

Aspects and implementations of the present disclosure provide a mechanism for protecting against cookie theft. A content sharing platform (or any other platform providing services to users) may use cookies to authorize service requests issued from a user account or an application of a client device. A client device may be a personal computer (PC), a laptop, a smart phone, a tablet computer, etc. A service request may include login requests, content upload requests, content search requests, content consume requests, purchase requests, and so forth. To protect against a third party copying the cookie and using the cookie to impersonate the user of the client device, existing systems may use secondary service verification methods, such as two-factor authentication, to authenticate certain service requests (e.g., login requests and purchase requests). Two-factor authentication may include the content sharing platform sending a verification code to another application associated with the user, such as to an email address or a telephone number. The user may then send the received verification code to the content sharing platform to authenticate a pending service request. However, using two-factor authentication is time consuming and cumbersome since the user may need to exit (or switch from) the content sharing platform's application or website to retrieve the verification code. This causes an undesirable latency, especially if used for each service request, which may consume additional time and computing resources, and inconvenience the user.

Aspects of the present disclosure address the above and other deficiencies by providing a mechanism to enable a physically co-located (e.g., within a relatively short or predetermined distance, within a shared line of sight, etc.) secondary client device to function as an authentication device capable of authenticating all or certain types of service requests initiated by a primary client device to a service provider platform. According to some aspects of the present disclosure, the primary client device and the secondary client device may be registered with a service provider platform. Both client devices may be associated with the same user account. For example, using the primary client device, a user may access their user account by providing user account information, such as a username and password. Once accessed, the user may register the primary client device with the user account using, for example, client device identification data (e.g., a device serial number, an identification number, an Internet Protocol (IP) address, location data, or other identification data associated with primary client device, etc.). Similarly, the user may register the secondary client device with the user account by providing, via the secondary client device, user account information to the service provider platform. In some embodiments, responsive to the registration, the service provider platform may send, to the primary client device and/or the secondary client device, one or more cryptographic keys, such as one or more public keys and/or one or more private keys. The cryptographic keys may be used to verify the identity of the respective client devices. The primary client device and the secondary client device may each receive a different set of the cryptographic keys.

The primary client device may then request that the secondary client device be used as an authentication device by the service provider platform. An authentication device may be a physically co-located secondary client device used to authenticate service requests issued by the primary client device. Using a co-located secondary device to authenticate service requests issued by the primary client device prevents a remote third party from impersonating the user of the primary client device because the third party would have to be physically located near the primary client device. In some embodiments, the type of service request that requires authentication by the authentication device (e.g., the secondary client device) may be pre-defined. For example, responsive to user input, the service provider platform may enable secondary device validation for only upload content requests and purchase requests.

In some implementations, the primary client device can issue a service request that requires secondary device validation to also generate an authentication token. The authentication token may include a random number, a random string, a cryptographic signature, a key-value pair, a hash value, a certificate, etc. The primary client device may then send the service request and the authentication token to the service provider platform. In some embodiments, the primary client device may append the authentication token to the service request. In other embodiments, the primary client device may send the service request and the authentication token in two separate transmissions. The primary client device may further send the authentication token to the secondary client device (e.g., the authentication device). In some embodiments, the primary client device may send the authentication token to the secondary client device using short range communication technology. The short range communication technology may be used to establish that the primary client device and the secondary client device are physically co-located. In some embodiments, the short range communication technology may include, e.g., wireless technology such as peer-to-peer (P2P), Bluetooth®, Bluetooth® Low Energy, Whisper®, Wi-Fi®, Wi-Fi Direct (Wi-Fi P2P), infrared technology, or ultrasonic technology. In some embodiments, the short range communication technology may include wired technology such as a cable connection (e.g., a Universal Serial Bus (USB) connector, an Ethernet connector, a Lighting connector, etc.). Once received, the secondary client device may send the authentication token to the service provider platform. In some embodiments, the secondary client device may first encrypt the authentication token, or sign the authentication token using the private and/or public key received from the service provider platform to verify the identity of the secondary client device.

The service provider platform may receive the authentication tokens from both client devices, optionally decrypt or validate the authenticity of the client devices using the private and/or public keys, and compare the authentication token received from the primary client device with the authentication token received from the secondary client device. Responsive to determining that the two authentication tokens match (e.g., the number or string from the received transmission of the primary client device is the same as the number or string from the received transmission of secondary client device), the service provider platform may authorize or process the service request received from the primary client device. In some embodiments, the secondary client device may perform relaying (e.g., receiving and transmitting) the authentication token as a background process (e.g., a process executed without user intervention). Thus, each service request initiated by the user may be processed with the additional security provided via the secondary device validation, and with little or no additional latency.

In some embodiments, the physical co-location of both client devices may be established using location data such as, for example, Internet Protocol (IP) addresses, media access control (MAC) addresses, Global Positioning System (GPS) data, etc. In particular, the primary client device and the secondary client device may send, to the service provider platform, the authentication token appended with respective location data. Upon receipt of the authentication tokens, the service provider platform may compare the location data of each token and determine whether the location data matches (e.g., determine whether the IP address appended to one authentication token corresponds to the IP address appended to the other authentication token). Responsive to determining that the two authentication tokens match, and that the location data appended to each authentication token also matches, the service provider platform may authorize or process the service request received from the primary client device.

Accordingly, aspects and implementations of the present disclosure provide user protection against a third party which would attempt to use a stolen cookie to impersonate the user by authenticating service requests via a co-located secondary client device. The technology disclosed herein is advantageous because it overcomes the limited abilities and functions currently available to users to prevent unauthorized service requests from their accounts. Instead, users are now capable of securely issuing service requests to a service provider platform with little or no additional latency and without generating a prompt to require user input (e.g., without requiring a user to manually enter any verification code on any user device). As such, the technology disclosed herein enables the user to have a more secure session with the service provider platform, and reduces time and computing resources that would be otherwise consumed to support the user's switching to a different application or website to retrieve a verification code, generate a prompt to request a user to enter the verification code, and monitor for and process the user input.

Implementations of the present disclosure reference authenticating service requests to a content sharing platform for simplicity and brevity. However, the teachings of the present disclosure may be applied to any service provider platforms that utilize cookies (or other authorization data), such as, for example, financial platforms, banking platforms, social media platforms, e-commerce platforms, etc.

FIG. 1 illustrates an example of system architecture 100, in accordance with one implementation of the present disclosure. The system architecture 100 (also referred to as "system" herein) includes first client device 110, second client device 120, server 130, network 150, and data store 135).

Network 150 may include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof.

Data store 135 may be a persistent storage that is capable of storing content items (such as media items) as well as data structures to tag, organize, and index the content items. Data store 135 may be hosted by one or more storage devices, such as main memory, magnetic or optical storage based disks, tapes or hard drives, NAS, SAN, and so forth. In some embodiments, data store 135 may be a network-attached file server, while in other embodiments data store 135 may be some other type of persistent storage such as an object-oriented database, a relational database, and so forth, that may be hosted by service provider platform 130 or one or more different machines coupled to the service provider platform 130. In some embodiments, data store 135 may be coupled to service provider platform 130 via network 150.

Client devices 110, 120 may each include computing devices such as personal computers (PCs), laptops, mobile phones, smart phones, tablet computers, netbook computers, network-connected televisions, etc. In some embodiments, client devices 110, 120 may also be referred to as "user devices." In some embodiments, each client device 110, 120 may include a media player 112 (or media viewer), link module 112, and a token module 116.

In some embodiments, the media players 112 may be applications that allow users to playback, view, or upload content, such as images, video items, web pages, documents, audio items, etc. For example, the media player 112 may be a web browser that may access, retrieve, present, or navigate content (e.g., web pages such as Hyper Text Markup Language (HTML) pages, digital media items, etc.) served by a web server. The media player 112 may render, display, or present the content (e.g., a web page, a media viewer) to a user. The media player 112 may also include an embedded media player (e.g., a Flash® player or an HTML5 player) that is embedded in a web page (e.g., a web page that may provide information about a product sold by an online merchant). In another example, the media player 112 may be a standalone application (e.g., a mobile application, or native application) that allows users to playback digital media items (e.g., digital video items, digital images, electronic books, etc.). According to aspects of the present disclosure, the media player 112 may be a content sharing platform application for users to record, edit, and/or upload content for sharing on the content sharing platform. As such, the media players 112 may be provided to the client devices 110, 120 by service provider platform 130. For example, the media players 112 may be embedded media players that are embedded in web pages provided by the service provider platform 130. In another example, the media players 112 may be applications that are downloaded from service provider platform 130. Implementations of the present disclosure reference media player 112 as an application for communicating (e.g., sending service requests, receiving content, etc.) with a content sharing platform for simplicity and brevity. However, in other embodiments, media player 112 may be one or more application that enable communication with other types of service provider platforms, such as, for example, financial platforms, banking platforms, social media platforms, e-commerce platforms, etc.

In some embodiments, first client device 110 may use link module 114 to couple (e.g., pair) and/or communicate with one or more second client devices 120. In some embodiments, the coupling may be based on short range communication technology, and both client device 110, 120 may be physically co-located (e.g., within a relatively short or predetermined distance, within a shared line of sight, etc.). In some embodiments, first client device 110 and second client device 120 may include wireless technology for establishing a short range coupling between first client device 110 and second client device 120. The wireless communication technology may include peer-to-peer (P2P), Bluetooth®, Bluetooth® Low Energy, Whisper®, Wi-Fi®, Wi-Fi Direct (Wi-Fi P2P), infrared, ultrasonic, or other technology. In some embodiments, first client device 110 and second client device 120 may include wired technology for establishing the short range coupling between first client device 110 and second client device 120. The wired communication technology may include a cable connection, such as, for example, a Universal Serial Bus (USB) connector, an Ethernet connector, a Lighting connector, or any other capable connector.

In some embodiments, link module 114 may generate location data that can be used to establish, by service provider platform 130, that first client device 110 and second client device 120 are physical co-located. For example, link module 114 (of each client device 110, 120) may send, to service provider platform 120, location data associated with respective client device 110, 120. The location data may include an Internet Protocol (IP) address associated with client device 110, 120, a media access control (MAC) address associated with client device 110, 120, geo-location data (e.g., Global Position System (GPS) data, cell phone tower data, Wi-Fi access point data, etc.), any other location data, or any combination thereof. In some embodiments, the location data may be appended to other data, such as an authentication token or a service request. In other embodiments, the location data may be sent, to service provider platform 130, independent of the other data. To establish physical co-location, service provider platform 130 may compare the location data received from client device 110 and 120, and determine if the location data matches (e.g., the location data indicates that close proximity of client devices 110 and 120). For example, service provider platform 130 may determine whether the IP address associated with first client device 110 is the same as the IP address associated with second client device 120 (e.g., if both client devices are connected to the same network at the same time).

Token module 116 may be used to generate one or more authentication tokens. The authentication token(s) may be generated for service requests issued to service provider platform 130, and may be used to authenticate the service request by using a validation client device (e.g., a client device physically co-located to the client device requesting the service). A service request may be any type of request issued by client device 110, 120 to service provider platform 130, such as, for example, login requests, upload content requests, content search requests, consume content requests, approve content requests, disapprove content requests, comment on content requests, setting change requests, personal details change requests, purchase requests, and so forth. In some embodiments, the authentication token may be a randomly generated number (e.g., a 64 bit number, a 128 bit number, etc.) or string. In other embodiments, the authentication token may be a cryptographic signature, a key-value pair, a hash value, a certificate, etc.

The authentication token may be sent by client device 110, 120 to client device 120, 110, respectively, and to service provider platform 130. In some embodiments, client device 110, 120, and/or service provider platform 130 may perform an authentication process on a received authentication token by decrypting the authentication token, determining a cryptographic signature of the authentication token, and/or performing any other process associated with authenticating the token, as will be discussed in more detail below. Responsive to authenticating the authentication token(s), service provider platform 130 may accept or execute the requested service request. For example, service provider platform 130 may initiate or continue playback of the requested digital media item, allow the upload of a requested digital media item, etc.

In some embodiments, the type of service request(s) that requires validation (by the verification client device) may be pre-defined. For example, the user may select, using media player 112, the type of service requests that require validation by the physically co-located validation device, where all other requests may not require validation by the validation device. For example, responsive to user input, authorizing data service 124 may enable validation device authentication for only login requests, upload content requests, and purchase requests.

In some embodiments, service provider platform 130 may include one or multiple computing devices (such as a rackmount server, a router computer, a server computer, a personal computer, a mainframe computer, a laptop computer, a tablet computer, a desktop computer, etc.), data stores (e.g., hard disks, memories, databases), networks, software components, or hardware components that may be used to provide a user with access to media items or provide the media items to the user. For example, service provider platform 130 may allow a user to consume, upload, search for, approve of ("like"), disapprove of ("dislike"), or comment on media items. Service provider platform 130 may also include a website (e.g., a webpage) or application back-end software that may be used to provide a user with access to the media items.

In some embodiments of the disclosure, a "user" may be represented as a single individual. However, other embodiments of the disclosure encompass a "user" being an entity controlled by a set of users and/or an automated source. For example, a set of individual users federated as a community in a social network may be considered a "user". In another example, an automated consumer may be an automated ingestion pipeline, such as a topic channel, of the service provider platform 130.

The service provider platform 130 may include multiple channels. A channel may be data content available from a common source or data content having a common topic, theme, or substance. The data content may be digital content chosen by a user, digital content made available by a user, digital content uploaded by a user, digital content chosen by a content provider, digital content chosen by a broadcaster, etc. For example, a channel X may include videos Y and Z. A channel may be associated with an owner, who is a user that may perform actions on the channel. Different activities may be associated with the channel based on the owner's actions, such as the owner making digital content available on the channel, the owner selecting (e.g., liking) digital content associated with another channel, the owner commenting on digital content associated with another channel, etc. The activities associated with the channel may be collected into an activity feed for the channel. Users, other than the owner of the channel, may subscribe to one or more channels in which they are interested. The concept of "subscribing" may also be referred to as "liking", "following", "friending", and so on.

Once a user subscribes to a channel, the user may be presented with information from the channel's activity feed. If a user subscribes to multiple channels, the activity feed for each channel to which the user is subscribed may be combined into a syndicated activity feed. Information from the syndicated activity feed may be presented to the user. Channels may have their own feeds. For example, when navigating to a home page of a channel on the service provider platform, feed items produced by that channel may be shown on the channel home page. Users may have a syndicated feed, which is a feed including at least a subset of the content items from all of the channels to which the user is subscribed. Syndicated feeds may also include content items from channels that the user is not subscribed. For example, service provider platform 130 or other social networks may insert recommended content items into the user's syndicated feed, or may insert content items associated with a related connection of the user in the syndicated feed.

Each channel may include one or more media items. Examples of a media item may include, and are not limited to, digital video, digital movies, digital photos, digital music, audio content, melodies, website content, social media updates, electronic books (ebooks), electronic magazines, digital newspapers, digital audio books, electronic journals, web blogs, real simple syndication (RSS) feeds, electronic comic books, software applications, etc. In some embodiments, media item is also referred to as content or a content item.

For brevity and simplicity, rather than limitation, a video item, audio item, or gaming item are used as an example of a media item throughout this document. As used herein, "media," media item," "online media item," "digital media," "digital media item," "content," and "content item" may include an electronic file that may be executed or loaded using software, firmware or hardware configured to present the digital media item to an entity. In one embodiment, service provider platform 130 may store the media items 132 using the data store 106. In another embodiment, service provider platform 130 may store video items or fingerprints as electronic files in one or more formats using data store 135.

In some embodiments, media items are video items. A video item is a set of sequential video frames (e.g., image frames) representing a scene in motion. For example, a series of sequential video frames may be captured continuously or later reconstructed to produce animation. Video items may be presented in various formats including, but not limited to, analog, digital, two-dimensional and three-dimensional video. Further, video items may include movies, video clips or any set of animated images to be displayed in sequence. In addition, a video item may be stored as a video file that includes a video component and an audio component. The video component may refer to video data in a video coding format or image coding format (e.g., H.264 (MPEG-4 AVC), H.264 MPEG-4 Part 2, Graphic Interchange Format (GIF), WebP, etc.). The audio component may refer to audio data in an audio coding format (e.g., advanced audio coding (AAC), MP3, etc.). It may be noted GIF may be saved as an image file (e.g., .gif file) or saved as a series of images into an animated GIF (e.g., GIF89a format). It may be noted that H.264 may be a video coding format that is block-oriented motion-compensation-based video compression standard for recording, compression, or distribution of video content, for example.

In some embodiments, the media item may be streamed, such as in a live stream to one or more of client devices 110, 120. It is be noted that "streamed" or "streaming" refers to a transmission or broadcast of content, such as a media item, where the received portions of the media item may be played back by a receiving device immediately upon receipt (within technological limitations) or while other portions of the media content are being delivered, and without the entire media item having been received by the receiving device. "Stream" may refer to content, such as a media item, that is streamed or streaming. A live-stream media item may refer to a live broadcast or transmission of a live event, where the media item is concurrently transmitted, at least in part, as the event occurs to a receiving device, and where the media item is not available in its entirety.

In some embodiments, service provider platform 130 may allow users to create, share, view or use playlists containing media items. A playlist refers to a collection of media items that are configured to play one after another in a particular order without any user interaction. In some embodiments, service provider platform 130 may maintain the playlist on behalf of a user. In some embodiments, the playlist feature of the service provider platform 130 allows users to group their favorite media items together in a single location for playback. In some embodiments, service provider platform 130 may send a media item on a playlist to client device 110, 120 for playback or display. For example, media viewer 112 may be used to play the media items on a playlist in the order in which the media items are listed on the playlist. In another example, a user may transition between media items on a playlist. In yet another example, a user may wait for the next media item on the playlist to play or may select a particular media item in the playlist for playback.

In some embodiments, the user may access content on sharing platform 130 through a user account. The user may access (e.g., log in to) the user account by providing user account information (e.g., username and password) via an application on client device 110, 120 (e.g., media viewer 112). In some embodiments, the user account may be associated with a single user. In other embodiments, the user account may be a shared account (e.g., family account shared by multiple users) (also referred to as "shared user account" herein). The shared account may have multiple user profiles, each associated with a different user. The multiple users may login to the shared account using the same account information or different account information. In some embodiments, the multiple users of the shared account may be differentiated based on the different user profiles of the shared account.

In some embodiments, an authorizing data service 134 may authorize a user account such that the user account is permitted to obtain requested content. In some embodiments, authorizing data service 134 may authorize a user account (e.g., client device associated with the user account) access to requested content, authorize delivery of the requested content to the client device, or both. Authorization of the user account to access the requested content may involve authorizing what content is accessed and who is permitted to access the content. Authorization of the delivery of the content may involve authorizing how the content is delivered.

In some embodiments, authorizing data service 134 may use user account information to authorize the user account. In some embodiments, an authentication token (e.g., a session-based authentication token, a content-based authentication token, etc.) associated with client device 110, 120 or media player 112 may be used to authorize the user account and/or playback of requested content. In some embodiments, authorizing data service 134 is part of service provider platform 130. In some embodiments, authorizing data service 134 is not part of the service provider platform 130 and is an external service, such as an authorizing service offered by a third-party (e.g., a trusted authentication service).

Although embodiments of the disclosure are discussed in terms of content sharing platforms and promoting social network sharing of a content item on the service provider platform 130, embodiments may also be generally applied to any type of network providing connections between users, to content delivery platforms, or to service provider platforms. Implementations of the disclosure are not limited to content sharing platforms that provide channel subscriptions to users.

Further to the descriptions above, a user may be provided with controls allowing the user to make an election as to both if and when systems, programs, or features described herein may enable collection of user information (e.g., information about a user's social network, social actions, or activities, profession, a user's preferences, or a user's current location), and if the user is sent content or communications from a server. In addition, certain data may be treated in one or more ways before it is stored or used, so that personally identifiable information is removed. For example, a user's identity may be treated so that no personally identifiable information may be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

Figure 2:
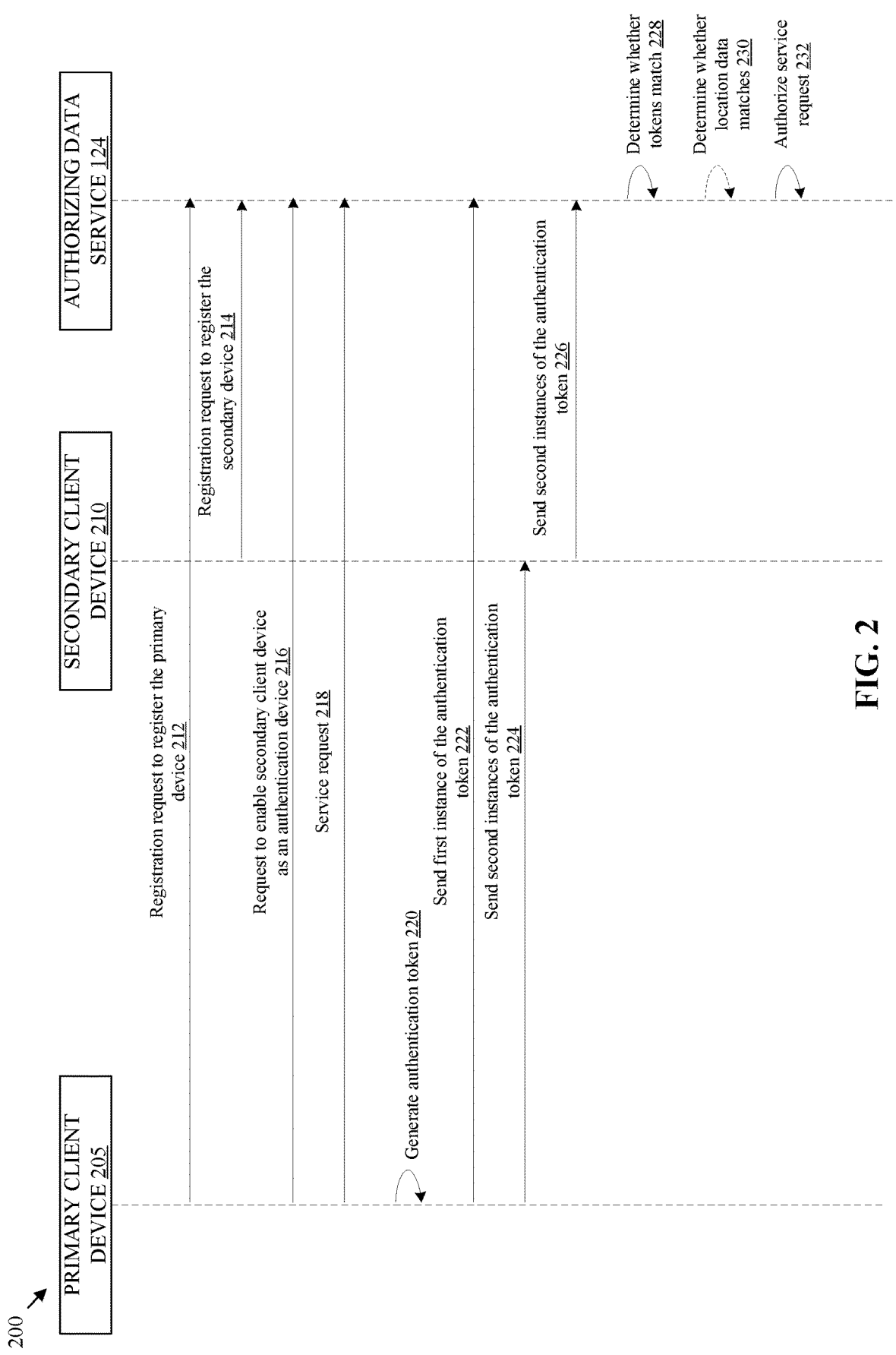
FIG. 2 depicts an interaction diagram of a method for authenticating, using a secondary client device, a service request initiated by a primary client device, according to an embodiment.

FIG. 2 is a diagram of operations for authenticating, using a secondary client device, a service request initiated by a primary client device, in accordance with embodiments of the disclosure. System 200 may include similar components as system architecture 100 of FIG. 1. It may be noted that components of FIG. 1 may be used to help describe FIG. 2. For purposes of illustration, rather than limitation, operations with respect to system 200 are described as performed by authorizing data service 124 of service provider platform 130, primary client device 205, and secondary client device 210. In some embodiments, primary client device 205 may be similar or the same as client device 110, and secondary client device 210 may be similar or the same as client device 120. As such, operations with respect to system 200 may be performed by any component of client devices 110, 120, such as, for example, media player 112, link module 114, and/or token module 116, unless otherwise described. The operations described with respect to FIG. 2 are shown to be performed sequentially for the sake of illustration, rather than limitation. It may be noted that the operations may be performed in any order and that any of the operations may be performed concurrently with one or more other operations. In some implementations, the same, different, fewer, or greater number of operations may be performed in any order.

At operation 212, primary client device 205 may send, to authorizing data service 124, a registration request to register primary client device 205 with a user account associated with content sharing platform (e.g., service provider platform 130). For example, a user may access a user account by providing user account information, such as a username and password, using the media viewer application (e.g., media viewer 112) on primary client device 205. Once accessed (e.g., the content sharing platform authorizing the user account), media viewer 112 may present a device registration button. The user may select the device registration button to send a registration request to register primary client device 205 with the content sharing platform. In some embodiments, the registration request may include client device identification data that the authorizing data service 124 may use to register primary client device 205. The client device identification data may include a device serial number, identification number, IP address, location data, or other identification data associated with primary client device 205. In some embodiments, responsive to the registration request, authorizing data service 124 may send a cookie to primary client device 205. Primary client device 205 may then use the cookie to prove registration during subsequent requests to content sharing platform. In some embodiments, responsive to the registration request, authorizing data service 124 may send, to primary client device 205, one or more cryptographic keys, such as one or more public keys and/or one or more private keys, a certificate, etc., which may be used, by the content sharing platform, to verify the identity of primary client device 205.

At operation 214, secondary client device 210 may send, to authorizing data service 124, a registration request to register secondary client device 210 with the user account associated with content sharing platform (e.g., service provider platform 130). Registering secondary client device 210 may be similar to registering primary client device 205. In particular, the user may access the user account by providing user account information, such as a username and password, using the media viewer application (e.g., media viewer 112) on secondary client device 210. Once accessed (e.g., the content sharing platform authorizing the user account), media viewer 112 may present a device registration button. The user may select the device registration button to send a registration request to register secondary client device 210 with the content sharing platform. In some embodiments, the registration request may include client device identification data that the authorizing data service 124 may use to register secondary client device 210. The client device identification data may include a device serial number, identification number, IP address, location data, or other identification data associated with secondary client device 210. In some embodiments, responsive to the registration request, authorizing data service 124 may send a cookie to secondary client device 210. Secondary client device 210 may then use the cookie to prove registration during subsequent requests to content sharing platform. In some embodiments, responsive to the registration request, authorizing data service 124 may send, to secondary client device 210, one or more cryptographic keys, such as one or more public keys and/or one or more private keys, a certificate, etc., which may be used, by secondary client device 210, to sign (or add to) messages sent to the content sharing platform to allow the content sharing platform to verify the identity of secondary client device 210.

At operation 216, primary client device 205 sends, to authorizing data service 124, a request to enable secondary client device 210 as an authentication device. An authentication device may be a physically co-located secondary device used to authenticate service requests issued by primary client device 205. A service request may be any type of request for a specific service issued by a client device to the content sharing platform. In some embodiments, the type of service request that requires authentication (by the authentication device) may be pre-defined. For example, responsive to user input, authorizing data service 124 may enable secondary device authentication for only login requests, upload content requests, and purchase requests.

At operation 218, primary client device 205 sends, to authorizing data service 124, a service request. For example, primary client device 205 may send, to authorizing data service 124, a request to upload content to a channel associated with the user account.

At operation 220, responsive to determining that the service request at operation 216 requires secondary device authentication, primary client device 205 generates an authentication token. The authentication token may be a randomly generated number (e.g., a 64 bit number, a 128 bit number, etc.), a string, a cryptographic signature, a key-value pair, a hash value, a certificate, etc. In some embodiments, primary client device 205 may determine that the service request requires secondary device authentication by scanning a data structure which lists the types of service requests that require secondary device authentication, and determining that the service request type is included in the listing. In some embodiments, primary client device 205 may receive an indication (e.g., an alert) from authorizing data service 124 that the secondary device authentication is required.

At operation 222, primary client device 205 sends a first instance of the authentication token to authorizing data service 124. The first instance of the authentication token may be sent as unencrypted data, or may be encrypted by primary client device 205. In some embodiments, primary client device 205 may append the first instance of the authentication token with a private and/or public key, a certificate, a cookie, or any other identification data capable of identifying primary client device 205 to authorizing data service 124. In some embodiments, primary client device 205 may append the first instance of the authentication token with location data, such as an IP address, a MAC address, GPS data, etc. The location data may be used by the authorizing data service 124 to verify that primary client device 205 and secondary client device 210 are physically co-located.

In some embodiments, the first instance of the authentication token may be appended to the service request. For example, responsive to receiving user input for a service request for the content sharing platform, primary client device 205 may generate the service request, generate the authentication token, append the first instance of the authentication token to the service request, and send the appended service request to authorizing data service 124.

At operation 224, primary client device 205 sends a second instance of the authentication token to secondary client device 210. The second instance of the authentication token may be sent as unencrypted data, or may be encrypted by primary client device 205. Since the authentication is based on secondary client device 210 being physically co-located with primary client device 205, in some embodiments, primary client device 205 may send the second instance of the authentication token to secondary client device 210 using short range communication technology. For example, primary client device 205 may send the second instance of the authentication token to secondary client device 210 using short range wireless communication technology such as, for example, P2P, Bluetooth®, Bluetooth® Low Energy, Whisper®, Wi-Fi®, Wi-Fi Direct (Wi-Fi P2P), infrared, ultrasonic, or other short range communication technology. In some embodiments, the second instance of the authentication token may be sent from primary client device 205 to secondary client device 210 using wired communication technology, such as a cable connection (e.g., a Universal Serial Bus (USB) connector, an Ethernet connector, a Lighting connector, or any other capable connector). In some embodiments, primary client device 205 may use more than one type of short range communication technology to send the authentication token to secondary client device 210. For example, primary client device 205 may first attempt to send the authentication token to secondary client device 210 using Bluetooth® technology, and, in response to a failed attempt, primary client device 205 may then attempt to send the second instance of the authentication token to secondary client device 210 using infrared technology. The types of short range communication technology used, the priority of each short range communication technology to be used, and the number of attempts of each type of short range communication technology may be configured by the client devices (e.g., via user settings of the user account) or by the content sharing platform.

At operation 226, secondary client device 210 sends the second instance of the authentication token to authorizing data service 124. In some embodiments, prior to sending the second instance of the authentication token, secondary client device 210 confirms that it is co-located with primary client device 205. In some embodiments, the co-location may be confirmed using Bluetooth®, Bluetooth® Low Energy (e.g., using the discovery function to determine whether primary client device 205 is within range, using the pairing function, etc.), using an ultrasonic audio modem (e.g., using the speakers and microphones of the client devices to communicate data to establish co-location), using shared IP detection (e.g., determining whether primary client device 205 and secondary client device 210 both are using the same IP address), using geo-location data (e.g., Global Position System (GPS) data, cell phone tower data, Wi-Fi access point data, etc.), using a wired connection, etc. The second instance of the authentication token may be sent as unencrypted data, or may be encrypted by secondary client device 210. In some embodiments, secondary client device 210 may append the second instance of the authentication token with a private and/or public key, a certificate, a cookie, or any other identification data capable of identifying secondary client device 205 to authorizing data service 124. In some embodiments, secondary client device 210 may append the second instance of the authentication token with location data, such as an IP address, a MAC address, GPS data, etc. The location data may be used by the authorizing data service 124 to verify that primary client device 205 and secondary client device 210 are physically co-located.

At operation 228, authorizing data service 124 compares (e.g., after decrypting the received message(s)) the first instance and the second instance of the authentication tokens received from each client device and determines whether the instances of the authentication tokens match. For example, authorizing data service 124 may determine whether the number or string received from primary client device 205 is the same as the number or string received from the secondary client device 210, whether the certificates received from each client device match, etc. In some embodiments, the authorizing data service 124 may first decrypt one or both of the authentication tokens, determining a cryptographic signature of the authentication token(s), and/or performing any other process associated with authenticating the token(s). In embodiments where the instances of the authentication tokens do not match, authorizing data service 124 may deny the pending service request.

At operation 230, authorizing data service 124 may, optionally, determine that primary client device 205 and secondary client device 210 are physically co-located. In some embodiments, authorizing data service 124 may determine physical co-location by using the location data appended to the authentication tokens received from primary client device 205 and secondary client device 210. For example, authorizing data service 124 may compare the location data appended to each respective token and determine whether the IP address, MAC address, or GPS data appended to the authentication token received from primary client device 205 matches the IP address, MAC address, or GPS data, respectively, appended to the authentication token received from secondary client device 210. In embodiments, where the location data does not match, authorizing data service 124 may deny the pending service request. It is noted that operation 230 is optional because, in other embodiments, the physical co-location of client devices 205, 210 may be established by receiving the authentication token from secondary client device 210 since in these other embodiments, secondary client device 210 is configured to send the authentication token only if it confirms that it is co-located with primary client device 205 (which may be confirmed if, for example, secondary client device 210 is able to communicate with primary client device 205 using short range communication technology).

At operation 232, authorizing data service 124 authorizes the service request. For example, authorizing data service 124 processes the pending service request received from primary client device 205.

Figure 3:
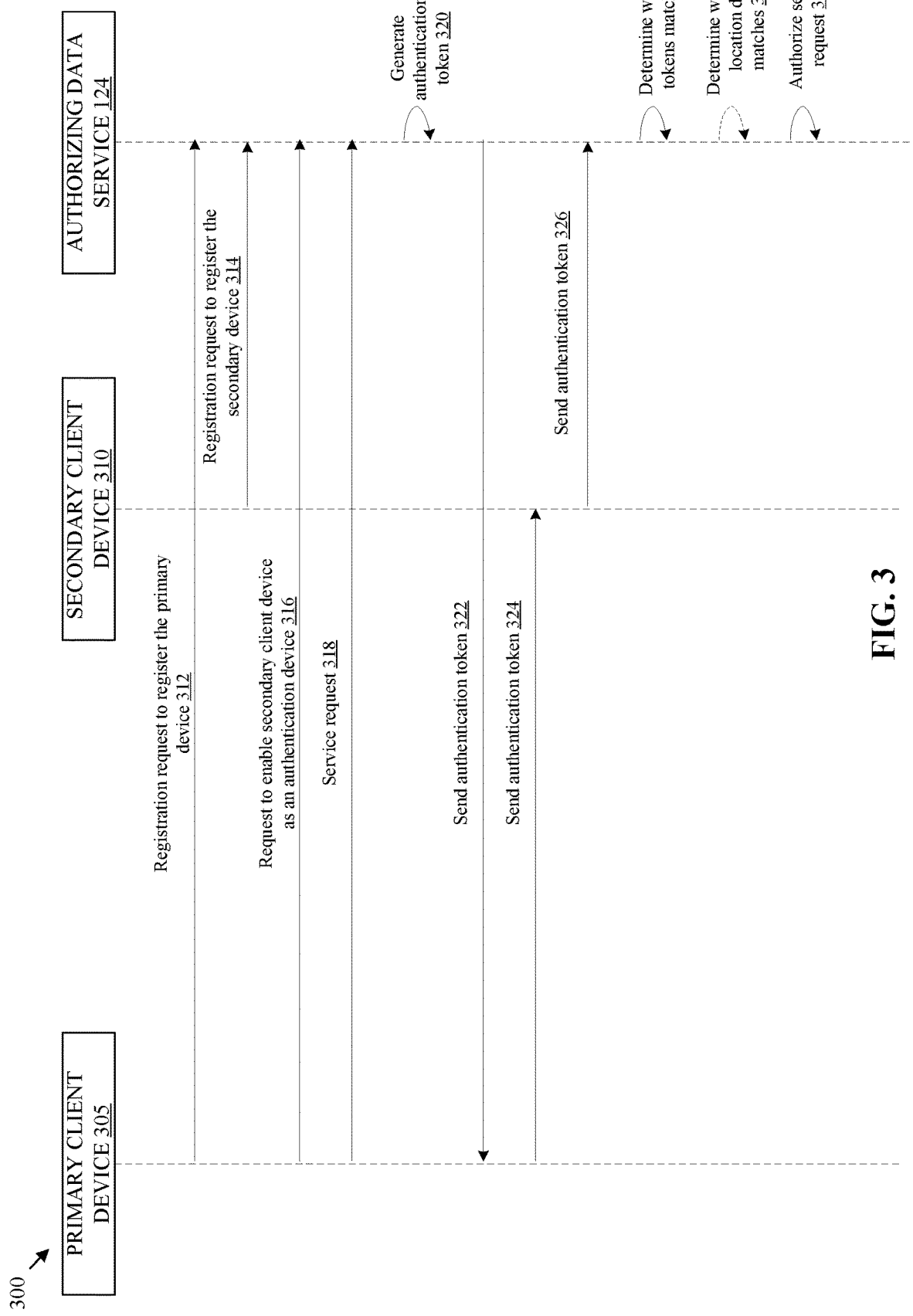
FIG. 3 depicts an interaction diagram of another method for authenticating, using a secondary client device, a service request initiated by a primary client device, according to an embodiment.

FIG. 3 is another diagram of operations for authenticating, using a secondary client device, a service request initiated by a primary client device, in accordance with embodiments of the disclosure. System 300 may include similar components as system architecture 100 of FIG. 1. It may be noted that components of FIG. 1 may be used to help describe FIG. 3. For purposes of illustration, rather than limitation, operations with respect to system 300 are described as performed by authorizing data service 124 of service provider platform 130, primary client device 305, and secondary client device 310. In some embodiments, primary client device 305 may be similar or the same as client device 110, and secondary client device 310 may be similar or the same as client device 120. As such, operations with respect to system 300 may be performed by any component of client devices 110, 120, such as, for example, media player 112, link module 114, and/or token module 116, unless otherwise described. The operations described with respect to FIG. 3 are shown to be performed sequentially for the sake of illustration, rather than limitation. It may be noted that the operations may be performed in any order and that any of the operations may be performed concurrently with one or more other operations. In some implementations, the same, different, fewer, or greater number of operations may be performed in any order.

At operation 312, primary client device 305 may send, to authorizing data service 124, a registration request to register primary client device 305 with the associated content sharing platform (e.g., service provider platform 130). The registration request may include client device identification data that the authorizing data service 124 may use to register primary client device 205. In some embodiments, responsive to the registration request, authorizing data service 124 may send a cookie, one or more cryptographic keys, such as one or more public keys and/or one or more private keys, a certificate, etc., to primary client device 305.

At operation 314, secondary client device 310 may send, to authorizing data service 124, a registration request to register secondary client device 310 with the associated content sharing platform (e.g., service provider platform 130). Registering secondary client device 310 may be similar to registering primary client device 305. In some embodiments, responsive to the registration request, authorizing data service 124 may send a cookie, one or more cryptographic keys, such as one or more public keys and/or one or more private keys, a certificate, etc., to secondary client device 310.

At operation 316, primary client device 305 sends, to authorizing data service 124, a request to enable secondary client device 310 as an authentication device. In some embodiments, the type of service request that requires authentication (by the authentication device) may be predefined.

At operation 318, primary client device 305 sends, to authorizing data service 124, a service request. For example, primary client device 305 may send, to authorizing data service 124, a request to upload content to a channel associated with the user account. In some embodiments, primary client device 310 may append the service request with location data, such as an IP address, a MAC address, GPS data, etc. The location data may be used by the authorizing data service 124 to verify that primary client device 305 and secondary client device 310 are physically co-located.

At operation 320, responsive to determining that the service request at operation 316 requires secondary device authentication, authorizing data service 124 generates an authentication token. The authentication token may be a randomly generated number (e.g., a 64 bit number, a 128 bit number, etc.), a string, a cryptographic signature, a key-value pair, a hash value, a certificate, etc. In some embodiments, authorizing data service 124 may determine that the service request requires secondary device authentication by scanning a data structure which lists the types of service requests that require secondary device authentication, and determining that the service request type is included in the listing. In some embodiments, primary client device 305 may receive an alert from authorizing data service 124 indicating that the secondary device authentication is required.

At operation 322, authorizing data service 124 sends the authentication token to primary client device 305. The authentication token may be sent as unencrypted data, or may be encrypted by authorizing data service 124.

At operation 324, primary client device 305 sends the authentication token to secondary client device 310. The authentication token may be sent as unencrypted data, or may be encrypted by primary client device 305. Since the authentication is based on secondary client device 310 being physically co-located with primary client device 305, in some embodiments, primary client device 305 may send the authentication token to secondary client device 310 using short range communication technology. For example, primary client device 305 may send the authentication token to secondary client device 310 using short range wireless communication technology or wired communication technology. In some embodiments, primary client device 305 may use more than one types of short range communication technology to send the authentication token to secondary client device 310.

At operation 326, secondary client device 310 sends the authentication token to authorizing data service 124. Similarly, the authentication token may be sent as unencrypted data, or may be encrypted by secondary client device 310. In some embodiments, secondary client device 310 may append the authentication token with a private and/or public key, a certificate, a cookie, or any other identification data capable of identifying secondary client device 305 to authorizing data service 124. In some embodiments, secondary client device 310 may append the authentication token with location data, such as an IP address, a MAC address, GPS data, etc. The location data may be used by the authorizing data service 124 to verify that primary client device 305 and secondary client device 310 are physically co-located.

At operation 328, authorizing data service 124 compares the authentication token received from secondary client device 310 to the authentication token issued to primary client device 305 at operation 322 and determines whether the authentication tokens match. For example, authorizing data service 124 may determine whether the number or string received from secondary client device 310 is the same as the number or string generated by authorizing data service 124. In some embodiments, the authorizing data service 124 may first decrypt the received authentication token, determine a cryptographic signature of the authentication token, and/or perform any other process associated with authenticating the token received from secondary client device 310. In embodiments where the authentication tokens do not match, authorizing data service 124 may deny the pending service request.

At operation 330, authorizing data service 124 may, optionally, determine that primary client device 305 and secondary client device 310 are physically co-located. In some embodiments, authorizing data service 124 may determine physical co-location by using the location data appended to the service request received from primary client device 305 and location data appended to the authentication token received from secondary client device 310. For example, authorizing data service 124 may compare the location data and determine whether the IP address, MAC address, or GPS data appended to the service request received from primary client device 305 matches the IP address, MAC address, or GPS data, respectively, appended to the authentication token received from secondary client device 310. In embodiments where the location data does not match, authorizing data service 124 may deny the pending service request.

At operation 332, authorizing data service 124 authorizes the service request. For example, authorizing data service 124 processes the pending service request received from primary client device 305.

Figure 4:
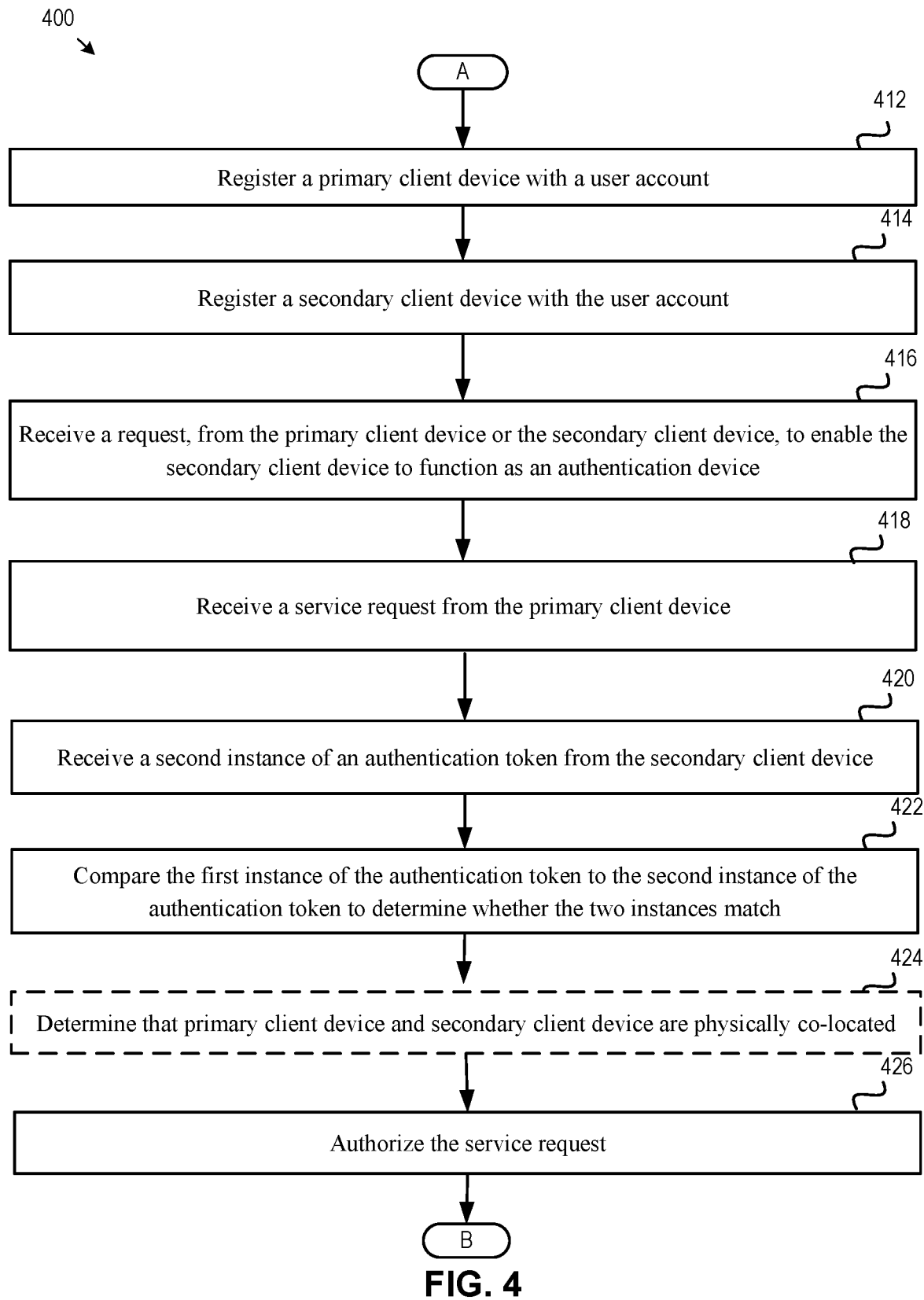
FIG. 4 depicts a flow diagram of a method for authenticating a service request initiated by a primary client device, in accordance with one implementation of the present disclosure.

FIG. 4 depicts a flow diagram of a method 400 showing a process for authenticating a service request initiated by a primary client device, in accordance with some aspects of the disclosure. The method 400 is performed by processing logic that may comprise hardware (circuitry, dedicated logic, etc.), software (such as is run on a general purpose computer system or a dedicated machine), or a combination of both. In one implementation, the method is performed by a server of service provider platform 130 or authorizing data service 124 associated with the server of service provider platform 130 of FIG. 1, while in some other implementations one or more blocks of FIG. 4 may be performed by another machine. In one implementation, a processing device of authorizing data service 134 performs method 400.

At operation 412, the processing device registers a primary client device with a user account. For example, the processing device may receive a registration request from the primary client device (e.g., first client device 110) to register the primary client device with a user account associated with the service provider platform. In some embodiments, the processing device may first receive user account information, such as a username and password, to enable the primary client device to access the user account. In some embodiments, the registration request may include client device identification data, such as a device serial number, identification number, IP address, location data, or other identification data associated with the primary client device. In some embodiments, once registered, the processing device may send a cookie to the primary client device. The primary client device may then use the cookie to prove registration during subsequent requests to service provider platform. In some embodiments, once registered, the processing device may send, to the primary client device, one or more cryptographic keys, such as one or more public keys and/or one or more private keys, a certificate, etc.

At operation 414, the processing device registers a secondary client device with a user account. For example, the processing device may receive a registration request from the secondary client device (e.g., second client device 120) to register the secondary client device with the user account associated with the service provider platform. In some embodiments, the processing device may first receive user account information, such as a username and password, to enable the secondary client device to access the user account. In some embodiments, the registration request may include client device identification data, such as a device serial number, identification number, IP address, location data, or other identification data associated with the secondary client device. In some embodiments, once registered, the processing device may send a cookie to the secondary client device. The secondary client device may then use the cookie to prove registration during subsequent requests to service provider platform. In some embodiments, once registered, the processing device may send, to the secondary client device, one or more cryptographic keys, such as one or more public keys and/or one or more private keys, a certificate, etc.

At operation 416, the processing device receives a request, from the primary client device or the secondary client device, to enable the secondary client device to function as an authentication device. In some embodiments, the type of service request that requires authentication (by the authentication device) may be pre-defined. For example, the processing device may receive user input to enable secondary device authentication for only login requests, upload content requests, and purchase requests.

At operation 418, the processing device receives a service request from the primary client device. For example, the processing device may receive a request to upload content to a channel associated with the user account. In some embodiments, the service request may include a cookie or any other type of identification data used to verify the identity of the primary client device. In addition, the processing device receives a first instance of an authentication token from the primary client device. The first instance of the authentication token may be associated with the service request. In some embodiments, the first instance of the authentication token is appended to the service request. The first instance of the authentication token may be a randomly generated number (e.g., a 64 bit number, a 128 bit number, etc.), a string, a cryptographic signature, a key-value pair, a hash value, a certificate, etc. In some embodiments, the first instance of the authentication token may include location data associated with the primary client device, such as an IP address, a MAC address, GPS data, etc. In some embodiments, the processing device may, once the first instance of the authentication token is received, decrypt the first instance of the authentication token, determine a cryptographic signature of the authentication token, and/or perform any other process associated with authenticating the token.

At operation 420, the processing device receives a second instance of an authentication token from the secondary client device. In some embodiments, the second instance of the authentication token may include location data associated with the secondary client device, such as an IP address, a MAC address, GPS data, etc. In some embodiments, second instance of the authentication token includes a private and/or public key, a certificate, a cookie, or any other identification data capable of identifying secondary client device. In some embodiments, the secondary client device may first confirm that it is co-located with the primary client device and only then send the second instance of the authentication token (e.g., after signing it using its private key(s)). In some embodiments, the processing device may (e.g., using the corresponding public key) first decrypt second instance of the authentication token, determine a cryptographic signature of the authentication token, and/or performing any other process associated with authenticating the token.

At operation 422, the processing device compares the first instance of the authentication token to the second instance of the authentication token to determine whether the two instances match. For example, the processing device may determine whether the number or string associated with the first instance is the same as the number or string associated with the second instance. In embodiments where the instances of the authentication tokens do not match, the processing device may deny the pending service request.

At operation 424, optionally, the processing device may determine that primary client device and secondary client device are physically co-located. In some embodiments, the processing device may determine physical co-location by using the location data received from the first instance and the second instance of the authentication tokens. For example, the processing device may determine whether the IP address, MAC address, or GPS data associated with the first instance of the authentication token (or associated with the service request) corresponds to (e.g., matches or otherwise indicates close proximity to) the IP address, MAC address, or GPS data, respectively, associated with the second instance of the authentication token. In embodiments where the location data of the primary client device does not correspond to the location data of the secondary client device, the processing device may deny the pending service request.

At operation 426, the processing device authorizes the service request. For example, the processing device may process the pending service request received from the primary client device.

Figure 5:
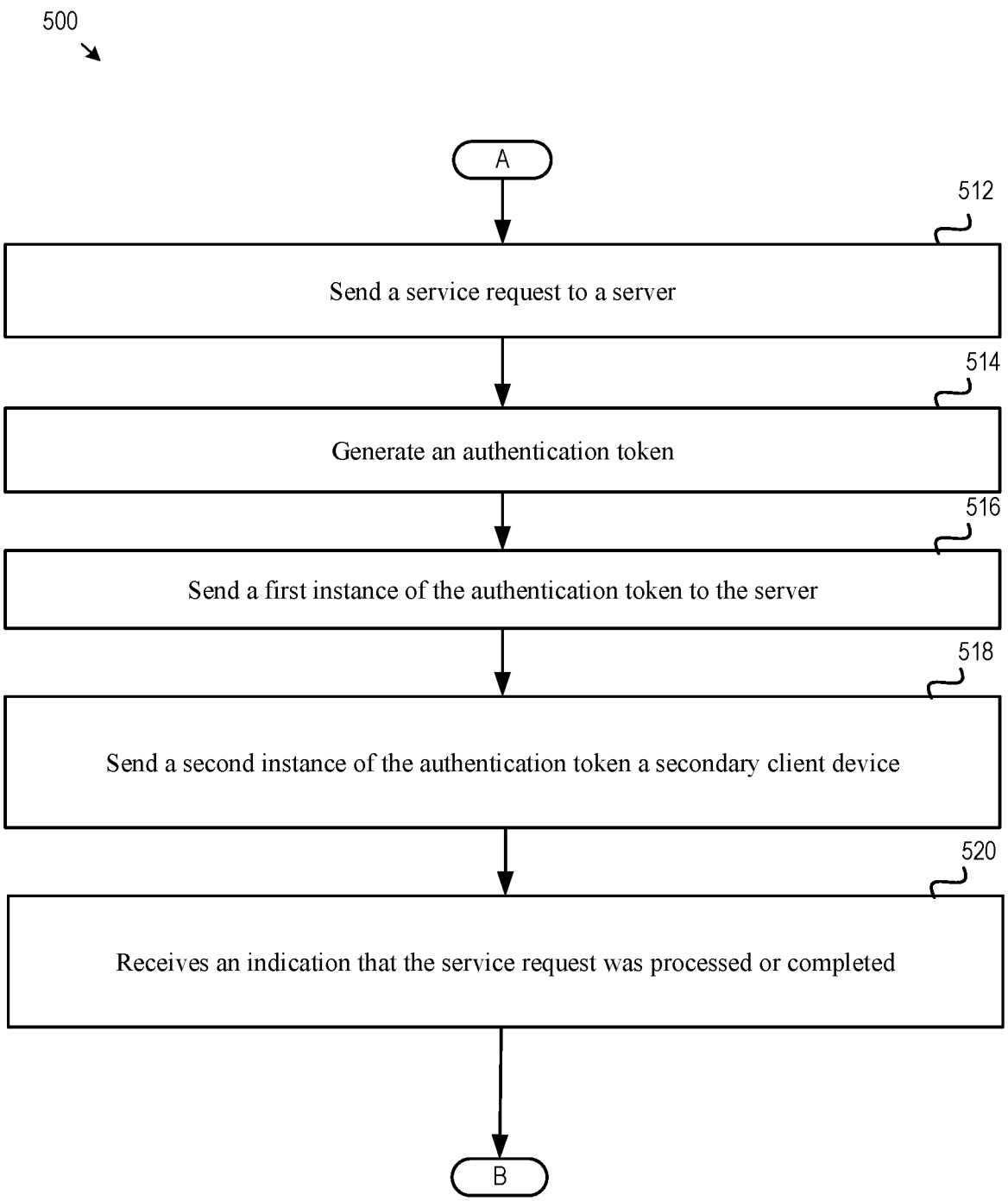
FIG. 5 depicts a flow diagram of a method for initiating a service request that requires authentication by an authentication device, in accordance with one implementation of the present disclosure.

FIG. 5 depicts a flow diagram of a method 500 showing a process for initiating a service request that requires authentication by an authentication device, in accordance with some aspects of the disclosure. The method 500 is performed by processing logic that may comprise hardware (circuitry, dedicated logic, etc.), software (such as is run on a general purpose computer system or a dedicated machine), or a combination of both. In one implementation, the method is performed by first client device 110 of FIG. 1, while in some other implementations one or more blocks of FIG. 5 may be performed by another machine. In one implementation, a processing device of first client device 110 performs method 500.

At operation 512, processing device sends a service request to a server (e.g., a server of a content sharing platform or any other service provider platform). For example, the processing device may send a request to upload content to a channel associated with a user account. In some embodiments, the service request may include a cookie or any other type of identification data used to verify the identity of the primary client device associated with the processing device. In some embodiments, the primary client device may be registered with the service provider platform.

At operation 514, the processing device generates an authentication token. The authentication token may be a randomly generated number (e.g., a 64 bit number, a 128 bit number, etc.), a string, a cryptographic signature, a key-value pair, a hash value, a certificate, etc.

At operation 516, the processing device sends a first instance of the authentication token to the server. In some embodiments, in which the first instance of the authentication token is appended to the service request, operations 512 and 516 are combined into a single operation that is performed after operation 514. In some embodiments, the first instance of the authentication token may include location data associated with the primary client device, such as an IP address, a MAC address, GPS data, etc. In some embodiments, the authentication token may be appended with a private and/or public key, a certificate, a cookie, or any other identification data.

At operation 518, the processing device sends a second instance of the authentication token a secondary client device. The secondary client device may be a physically co-located authentication device used to authenticate service requests issued by the primary client device. The second instance of the authentication token may be sent as unencrypted data, or may be encrypted by the processing device. Since the authentication is based on secondary client device being physically co-located with primary client device, in some embodiments, the processing device may send the authentication token to secondary client device using wired or wireless short range communication technology.

At operation 520, the processing device receives, from the server, a response representing acceptance of the service request by the server, the response indicating that the first instance of the authentication token sent to the server by the first client device matches the second instance of the authentication token sent to the server by the second client device. In some embodiments, the response includes an indication that the service request was processed or completed. The service request may be processed or completed responsive to the server comparing the first instance of the authentication token to the second instance of the authentication token and determining that the two instances match. In embodiments where the instances of the authentication tokens do not match, the processing device may receive an indication that the service request was denied.

Figure 6:
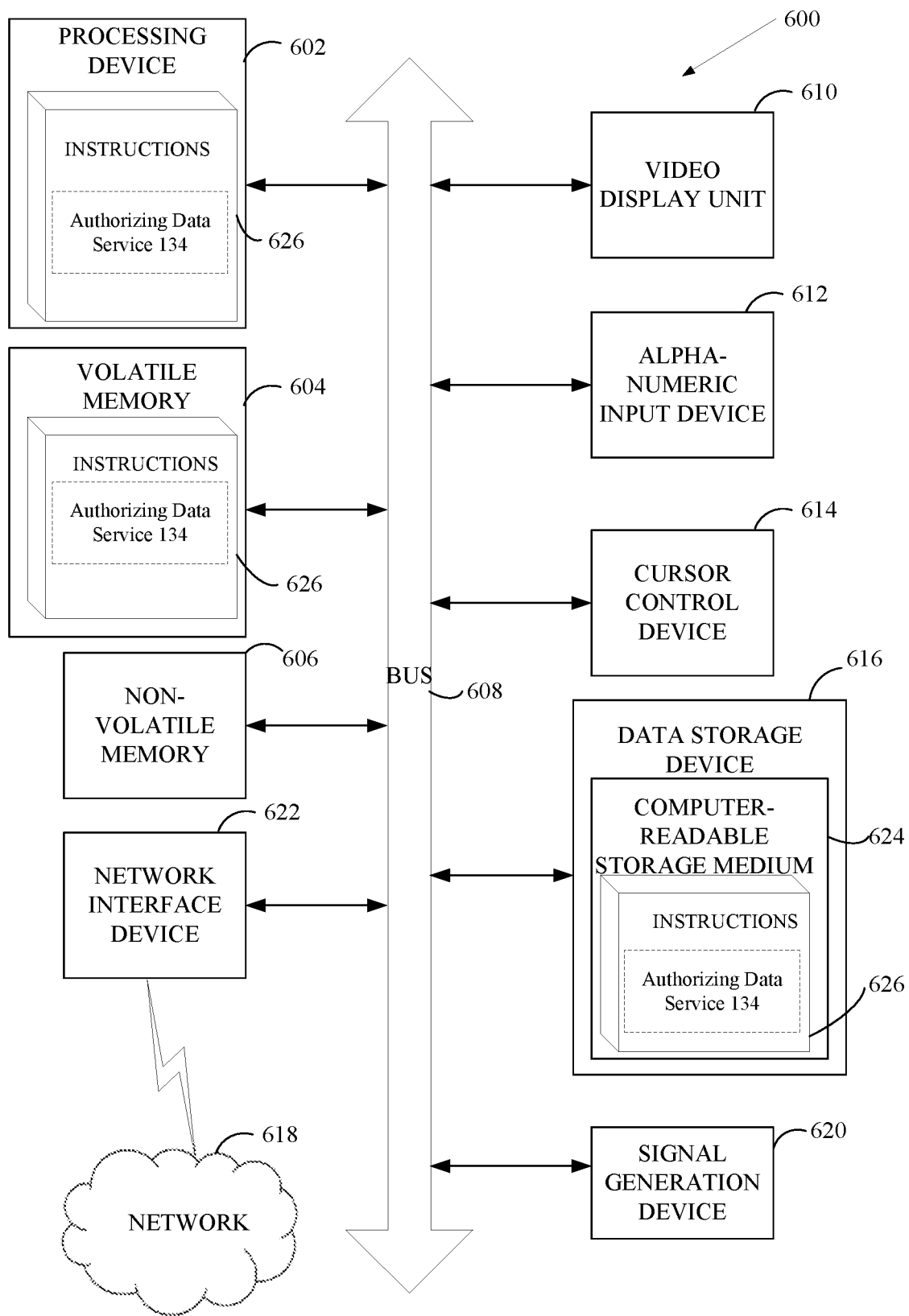
FIG. 6 depicts a block diagram of an example computing device operating in accordance with one or more aspects of the present disclosure.

FIG. 6 is a block diagram illustrating an exemplary computer system 600, in accordance with an embodiment of the disclosure. The computer system 600 executes one or more sets of instructions that cause the machine to perform any one or more of the methodologies discussed herein. Set of instructions, instructions, and the like may refer to instructions that, when executed computer system 600, cause computer system 600 to perform one or more operations of client device 110, 120 (not shown), and/or authorizing data service. The machine may operate in the capacity of a server or a client device in client-server network environment, or as a peer machine in a peer-to-peer (or distributed) network environment. The machine may be a personal computer (PC), a tablet PC, a set-top box (STB), a personal digital assistant (PDA), a mobile telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute the sets of instructions to perform any one or more of the methodologies discussed herein.

The computer system 600 includes a processing device 602, a main memory 604 (e.g., read-only memory (ROM), flash memory, dynamic random access memory (DRAM) such as synchronous DRAM (SDRAM) or Rambus DRAM (RDRAM), etc.), a static memory 606 (e.g., flash memory, static random access memory (SRAM), etc.), and a data storage device 616, which communicate with each other via a bus 608.

The processing device 602 represents one or more general-purpose processing devices such as a microprocessor, central processing unit, or the like. More particularly, the processing device 602 may be a complex instruction set computing (CISC) microprocessor, reduced instruction set computing (RISC) microprocessor, very long instruction word (VLIW) microprocessor, or a processing device implementing other instruction sets or processing devices implementing a combination of instruction sets. The processing device 602 may also be one or more special-purpose processing devices such as an application specific integrated circuit (ASIC), a field programmable gate array (FPGA), a digital signal processor (DSP), network processor, or the like. The processing device 602 is configured to execute instructions of the system architecture 100 and authorization module 151 for performing the operations discussed herein.

The computer system 600 may further include a network interface device 622 that provides communication with other machines over a network 618, such as a local area network (LAN), an intranet, an extranet, or the Internet. The computer system 600 also may include a display device 610 (e.g., a liquid crystal display (LCD) or a cathode ray tube (CRT)), an alphanumeric input device 612 (e.g., a keyboard), a cursor control device 614 (e.g., a mouse), and a signal generation device 620 (e.g., a speaker).

The data storage device 616 may include a non-transitory computer-readable storage medium 624 on which is stored the sets of instructions of the system architecture 100 or of authorization module 138 embodying any one or more of the methodologies or functions described herein. The sets of instructions of the system architecture 100, client device 110, 120 (not shown), and/or authorizing data service may also reside, completely or at least partially, within the main memory 604 and/or within the processing device 602 during execution thereof by the computer system 600, the main memory 604 and the processing device 602 also constituting computer-readable storage media. The sets of instructions may further be transmitted or received over the network 618 via the network interface device 622.

While the example of the computer-readable storage medium 624 is shown as a single medium, the term "computer-readable storage medium" can include a single medium or multiple media (e.g., a centralized or distributed database, and/or associated caches and servers) that store the sets of instructions. The term "computer-readable storage medium" can include any medium that is capable of storing, encoding or carrying a set of instructions for execution by the machine and that cause the machine to perform any one or more of the methodologies of the disclosure. The term "computer-readable storage medium" can include, but not be limited to, solid-state memories, optical media, and magnetic media.

In the foregoing description, numerous details are set forth. It will be apparent, however, to one of ordinary skill in the art having the benefit of this disclosure, that the disclosure may be practiced without these specific details. In some instances, well-known structures and devices are shown in block diagram form, rather than in detail, in order to avoid obscuring the disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It may be borne in mind, however, that all of these and similar terms are to be associated with the appropriate physical quantities and are merely convenient labels applied to these quantities. Unless specifically stated otherwise, it is appreciated that throughout the description, discussions utilizing terms such as "generating", "providing", "adjusting", "receiving", "canceling", or the like, refer to the actions and processes of a computer system, or similar electronic computing device, that manipulates and transforms data represented as physical (e.g., electronic) quantities within the computer system memories or registers into other data similarly represented as physical quantities within the computer system memories or registers or other such information storage, transmission or display devices.

The disclosure also relates to an apparatus for performing the operations herein. This apparatus may be specially constructed for the required purposes, or it may include a general purpose computer selectively activated or reconfigured by a computer program stored in the computer. Such a computer program may be stored in a computer readable storage medium, such as, but not limited to, any type of disk including a floppy disk, an optical disk, a compact disc read-only memory (CD-ROM), a magnetic-optical disk, a read-only memory (ROM), a random access memory (RAM), an erasable programmable read-only memory (EPROM), an electrically erasable programmable read-only memory (EEPROM), a magnetic or optical card, or any type of media suitable for storing electronic instructions.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims may generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. The terms "first," "second," "third," "fourth," etc. as used herein are meant as labels to distinguish among different elements and may not necessarily have an ordinal meaning according to their numerical designation.

For simplicity of explanation, methods herein are depicted and described as a series of acts or operations. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

In additional embodiments, one or more processing devices for performing the operations of the above described embodiments are disclosed. Additionally, in embodiments of the disclosure, a non-transitory computer-readable storage medium stores instructions for performing the operations of the described embodiments. Also in other embodiments, systems for performing the operations of the described embodiments are also disclosed.

It is to be understood that the above description is intended to be illustrative, and not restrictive. Other embodiments will be apparent to those of skill in the art upon reading and understanding the above description. The scope of the disclosure may, therefore, be determined with reference to the appended claims, along with the full scope of equivalents to which such claims are entitled.

What is claimed is:

1. A method, comprising:
receiving, by a server, a service request from a first client device, and a first instance of an authentication token associated with the service request and generated by the first client device, and first location data associated with the first instance of the authentication token and reflecting a physical location of the first client device;
receiving, by the server, from a second client device, a second instance of the authentication token associated with the service request and generated by the first client device, and second location data associated with the second instance of the authentication token and reflecting a physical location of the second client device, wherein the second client device received the second instance of the authentication token from the first client device, wherein the second instance of the authentication token is a duplicate of the first instance of the authentication token;
determining, by the server, that the first instance of the authentication token matches the second instance of the authentication token and that the first location data matches the second location data; and
responsive to determining that the first instance of the authentication token matches the second instance of the authentication token and that the first location data matches the second location data, processing, by the server, the service request.

2. The method of claim 1,
wherein the first location data is associated with the first client device and the second location data is associated with the second client device.

3. The method of claim 2, wherein the first location data comprises at least one of an Internet Protocol (IP) address, a media access control (MAC) address, Global Position System (GPS) data, cell phone tower data, or Wi-Fi access point data.

4. The method of claim 1, wherein the service request comprises at least one of a login request, an upload content request, a content search request, a consume content request, an approve content request, a disapprove content request, a comment on content request, a setting change request, a personal details change request, or a purchase request.

5. The method of claim 1, wherein the authentication token comprises at least one of a randomly generated number, a randomly generated string, a cryptographic signature, a key-value pair, a hash value, or a certificate.

6. The method of claim 1, wherein the second client device is registered as an authentication device for the first client device.

7. The method of claim 1, wherein the service request is identified as a type of service request that requires authentication by the second client device.

8. The method of claim 1, further comprising:
responsive to determining that the first instance of the authentication token does not match the second instance of the authentication token, rejecting the service request.

9. The method of claim 2, further comprising:
responsive to determining that the first location data does not correspond to the second location data, rejecting the service request.

10. A method comprising:
generating, by a first client device, a first instance of an authentication token and a second instance of the authentication token, wherein the second instance of the authentication token is a duplicate of the first instance of the authentication token, wherein the first instance of the authentication token is associated with first location data and reflects a physical location of the first client device, wherein the second instance of the authentication token is associated with second location data and reflects a physical location of the second client device;
sending, by the first client device, a service request and the first instance of the authentication token to a server;
sending, by the first client device, the second instance of the authentication token to a second client device; and
receiving, by the first client device, from the server, a response representing acceptance of the service request by the server, the response indicating that the server determined that the first instance of the authentication token sent to the server by the first client device matches the second instance of the authentication token sent to the server by the second client device and that the first location data matches the second location data.

11. The method of claim 10, wherein the second instance of the authentication token is sent to the second client device using short range communication technology.

12. The method of claim 10, further comprising sending the first location data, associated with the first client device, to the server, wherein the response representing acceptance of the service request by the server further indicates that the first location data sent to the server by the first client device corresponds to the second location data sent to the server by the second client device.

13. The method of claim 12, wherein the first location data comprises at least one of an Internet Protocol (IP) address, a media access control (MAC) address, Global Position System (GPS) data, cell phone tower data, or Wi-Fi access point data.

14. The method of claim 10, wherein the service request comprises at least one of a login request, an upload content request, a content search request, a consume content request, an approve content request, a disapprove content request, a comment on content request, a setting change request, a personal details change request, or a purchase request.

15. The method of claim 10, wherein the authentication token comprises at least one of a randomly generated number, a randomly generated string, a cryptographic signature, a key-value pair, a hash value, or a certificate.

16. The method of claim 10, wherein the second client device is registered as an authentication device for the first client device.

17. The method of claim 10, wherein the service request is identified as a type of service request that requires authentication by the second client device.

18. The method of claim 12, wherein the second location data is sent to the server by the second client device after the second client device has determined that the second client device is co-located with the first client device.

19. A system comprising:
a memory; and
a processing device, coupled to the memory, configured to:
receive a service request from a first client device;
receive, from the first client device, a first instance of an authentication token associated with the service request, and first location data associated with the first instance of the authentication token and reflecting a physical location of the first client device;
receive, from a second client device, a second instance of the authentication token associated with the service request, wherein the second instance of the authentication token was generated by the first client device, and second location data associated with the second instance of the authentication token and reflecting a physical location of the second client device, wherein the second client device received the second instance of the authentication token from the first client device, wherein the second instance of the authentication token is a duplicate of the first instance of the authentication token;

determine that the first instance of the authentication token matches the second instance of the authentication token and that the first location data matches the second location data; and responsive to determining that the first instance of the authentication token matches the second instance of the authentication token and that the first location data matches the second location data, process the service request.

20. The system of claim 19, wherein the first location is associated with the first client device and the second location data is associated with the second client device.

21. The system of claim 19, wherein the processing device is further configured to:

responsive to determining that the first instance of the authentication token does not match the second instance of the authentication token, reject the service request.

* * * * *